United States Patent
Schmidt et al.

(10) Patent No.: US 10,435,243 B2
(45) Date of Patent: Oct. 8, 2019

(54) RACKING SYSTEM AND METHOD FOR OPERATING A RACKING SYSTEM HAVING A VEHICLE

(71) Applicant: SEW-EURODRIVE GMBH & CO. KG, Bruchsal (DE)

(72) Inventors: Josef Schmidt, Graben-Neudorf (DE); Dirk Degen, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 0 days.

(21) Appl. No.: 15/563,536

(22) PCT Filed: Feb. 29, 2016

(86) PCT No.: PCT/EP2016/000348
§ 371 (c)(1),
(2) Date: Sep. 29, 2017

(87) PCT Pub. No.: WO2016/155862
PCT Pub. Date: Oct. 6, 2016

(65) Prior Publication Data
US 2018/0086560 A1    Mar. 29, 2018

(30) Foreign Application Priority Data
Apr. 1, 2015   (DE) .................. 10 2015 004 135

(51) Int. Cl.
*B65G 1/04* (2006.01)
*B60B 19/00* (2006.01)
(Continued)

(52) U.S. Cl.
CPC .......... *B65G 1/0492* (2013.01); *B60B 19/003* (2013.01); *B66F 9/063* (2013.01);
(Continued)

(58) Field of Classification Search
CPC ................ B65G 1/0478; B65G 1/0492; B65G 2207/34; B60B 19/003; B60B 19/125;
(Continued)

(56) References Cited

U.S. PATENT DOCUMENTS 5,213,176 A * 5/1993 Oroku ................... B60B 19/003
                                                                180/168
6,340,065 B1 * 1/2002 Harris ................... B60B 19/003
                                                                180/20
(Continued)

FOREIGN PATENT DOCUMENTS

CA     2 804 373 A1    1/2012
CN     101613066 A    12/2009
(Continued)

OTHER PUBLICATIONS

MM Logistik, "Transportsysteme mit Mecanum-Rädern", Nov. 10, 2014, retrieved from: http://www.mm-logistik.vogel.de/transportsysteme-mit-mecanum-raedern-a-465902/.
(Continued)

*Primary Examiner* — Glenn F Myers
(74) *Attorney, Agent, or Firm* — Hunton Andrews Kurth LLP

(57) ABSTRACT

In a racking system and a method for operating a racking system having a vehicle, the vehicle has omnidirectional wheels.

8 Claims, 5 Drawing Sheets

(51) Int. Cl.
*B66F 9/075* (2006.01)
*B66F 9/06* (2006.01)

(52) U.S. Cl.
CPC ...... *B66F 9/07568* (2013.01); *B66F 9/07577* (2013.01); *B65G 2207/34* (2013.01)

(58) Field of Classification Search
CPC ........ B66F 9/063; B66F 9/07568; E04H 6/24; E04H 6/34; E04H 6/36; B60L 5/005; B60L 11/182; B60L 11/189; B60L 11/1829
See application file for complete search history.

(56) References Cited

U.S. PATENT DOCUMENTS

| | | | |
|---|---|---|---|
| 9,221,506 B1* | 12/2015 | Georgeson | ............... B05C 1/00 |
| 9,969,570 B2* | 5/2018 | Heise | ................... B65G 54/02 |
| 2002/0119031 A1* | 8/2002 | Karlen | ................. B63B 25/22 414/137.1 |
| 2007/0065258 A1 | 3/2007 | Benedict et al. | |
| 2008/0087484 A1 | 4/2008 | Fenelli et al. | |
| 2008/0185222 A1 | 8/2008 | Herrmann et al. | |
| 2011/0254376 A1* | 10/2011 | Sasaki | ................. B60L 5/005 307/104 |
| 2012/0290125 A1 | 11/2012 | Perry | |
| 2014/0322570 A1* | 10/2014 | Nakamura | .............. B60K 1/00 429/72 |
| 2014/0365061 A1 | 12/2014 | Vasquez et al. | |
| 2015/0001957 A1* | 1/2015 | Ichikawa | .............. B60L 11/182 307/104 |
| 2016/0381829 A1* | 12/2016 | Niizuma | ................. H02J 50/70 361/699 |
| 2017/0226764 A1 | 8/2017 | Nussbaum | |

FOREIGN PATENT DOCUMENTS

| | | | | |
|---|---|---|---|---|
| CN | 104192320 A | 12/2014 | | |
| DE | 10 2014 112269 A1 | 3/2016 | | |
| EP | 1 254 852 A1 | 11/2002 | | |
| EP | 1361109 A2 * | 11/2003 | ........... | B60B 19/003 |
| FR | 3 015 915 A1 | 7/2015 | | |
| WO | 2011/104716 A1 | 9/2011 | | |
| WO | 2015/107527 A1 | 7/2015 | | |

OTHER PUBLICATIONS

Drahtlose Energieübertragung ("Wireless Power Transmission"), Wikipedia entry, version edited Mar. 2, 2015.
G. Ullrich, "Das Faherlose Transportfahrzeug (FTF)", Stand der Technik. In: Fahrerlose Transportsysteme. Fortschritte der Robotik (2011), pp. 80, 117.
I. Doroftei et al., "Omnidirectional Mobile Robot—Design and Implementation", Chapter 29 of Bioinspiration and Robotics Walking and Climbing Robots, Maki K. Habib (Ed.), InTech, 2007, pp. 512-528.
International Search Report dated Jun. 1, 2016, in International Application No. PCT/EP2016/000348. (English-language translation).
International Preliminary Report on Patentability, dated Oct. 3, 2017, in International Application No. PCT/EP2016/000348. (English-language translation).

* cited by examiner

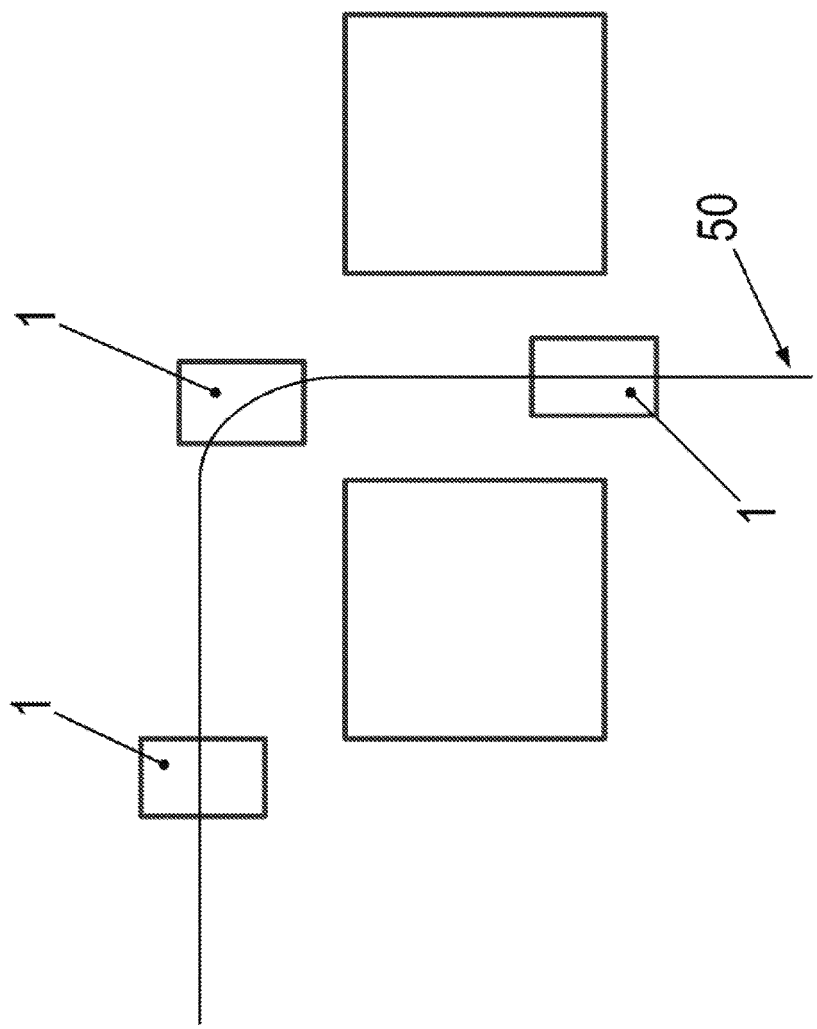

ures, the vehicle is brought from forward driving via a curve to sideways driving, and the vehicle is not rotated relative to the parts of the racking system that are immovable.

RACKING SYSTEM AND METHOD FOR OPERATING A RACKING SYSTEM HAVING A VEHICLE

FIELD OF THE INVENTION

The present invention relates to a racking system and to a method for operating a racking system having a vehicle.

BACKGROUND INFORMATION

The page http://de.wikipedia.org/wiki/Mecanum-Rad describes that the Mecanum wheel is a wheel that allows a vehicle equipped with such a wheel to execute onmidirectional driving maneuvers without having to be equipped with a mechanical steering system. It is sometimes also called an Ilon wheel after its Swedish inventor Bengt Ilon. Ilon invented this wheel in 1973 as an engineer at the Swedish company Mecanum AB. In contrast to the omniwheel, the rollers in the Mecanum wheel are situated at an angle to the main axis.

In the following text, both the Mecanum wheel and the omniwheel are referred to as omnidirectional wheels. Accordingly, this omnidirectional wheel allows omnidirectional driving maneuvers.

SUMMARY

Example embodiments of the present invention provide for designing and/or operating a racking system in the most effective manner.

According to an example embodiment of the present invention, the racking system includes a vehicle having omnidirectional wheels.

This has the advantage that the width of an aisle may correspond to the length of the vehicle, and the width of an aisle extending in a transverse direction may correspond to the width of the vehicle. This allows for a very compact arrangement inasmuch as the vehicle is able to change the driving direction without a rotation of the vehicle, in particular change a direction from forward driving to sideways driving. The same wheels may be used for the entire operation, which means that there is no need to exchange or modify the wheels.

Each omnidirectional wheel may have a drive. This is considered advantageous because it allows for an exact and precise control of the driving direction.

The vehicle may have a length and a width; here, the absolute amount of the length is greater than the absolute amount of the width. This is considered advantageous since it allows the aisles to be arranged at a corresponding width.

A main aisle may be at least half as wide as the length. This is considered advantageous inasmuch as it allows for a space-saving arrangement of the high-bay racking system.

A side aisle may be at least as wide as the width and not as wide as the length. This has the advantage of allowing for a space-saving arrangement of the high-bay racking system.

A secondary winding, which is able to be inductively coupled with a primary conductor situated in a hoisting platform and/or with a primary conductor disposed in an aisle, may be situated on the underside of the vehicle, in particular a capacitance being connected to the secondary winding, in series or in parallel, such that the resonant frequency of the oscillating circuit formed in this manner substantially corresponds to the frequency of the current impressed into the primary conductor. This is considered advantageous in that the energy store is able to be charged and/or the electrical consumers of the vehicle are able to be supplied during the forward driving, e.g., the main-aisle driving, or while driving in the lift.

The vehicle may include a hoisting gear, so that a load is able to be handled by the vehicle underriding the load and the hoisting gear being raised subsequently. This is considered advantageous since a load may be picked up and set down in an uncomplicated manner.

According to an example embodiment of the present invention in the method for operating a racking system, the vehicle is brought from forward driving via a curve to sideways driving, and the vehicle is not rotated relative to the parts of the racking system that are immovable.

This has the advantage of allowing for a space-saving arrangement of the racking system, in particular the high-bay racking system. In addition, a rapid, smooth operation is possible.

Alternatively, the vehicle is able to be brought from forward driving to sideways driving by braking, stopping and subsequent accelerating in the transverse direction, the vehicle not being rotated relative to the parts of the racking system that are immovable.

This has the advantage of allowing for a space-saving arrangement of the racking system, especially the high-bay racking system. In particular, no spatial area is required for negotiating curves.

Further features and aspects of example embodiments of the present invention are explained in greater detail below with reference to the Figures.

BRIEF DESCRIPTION OF THE DRAWINGS

FIG. 5 shows trajectory 50 of vehicle 1 when turning from main aisle driving into a side aisle; here, no rotation of vehicle 1 is taking place yet the center of mass of the vehicle is moving along trajectory 50.

DETAILED DESCRIPTION

Figure 1:
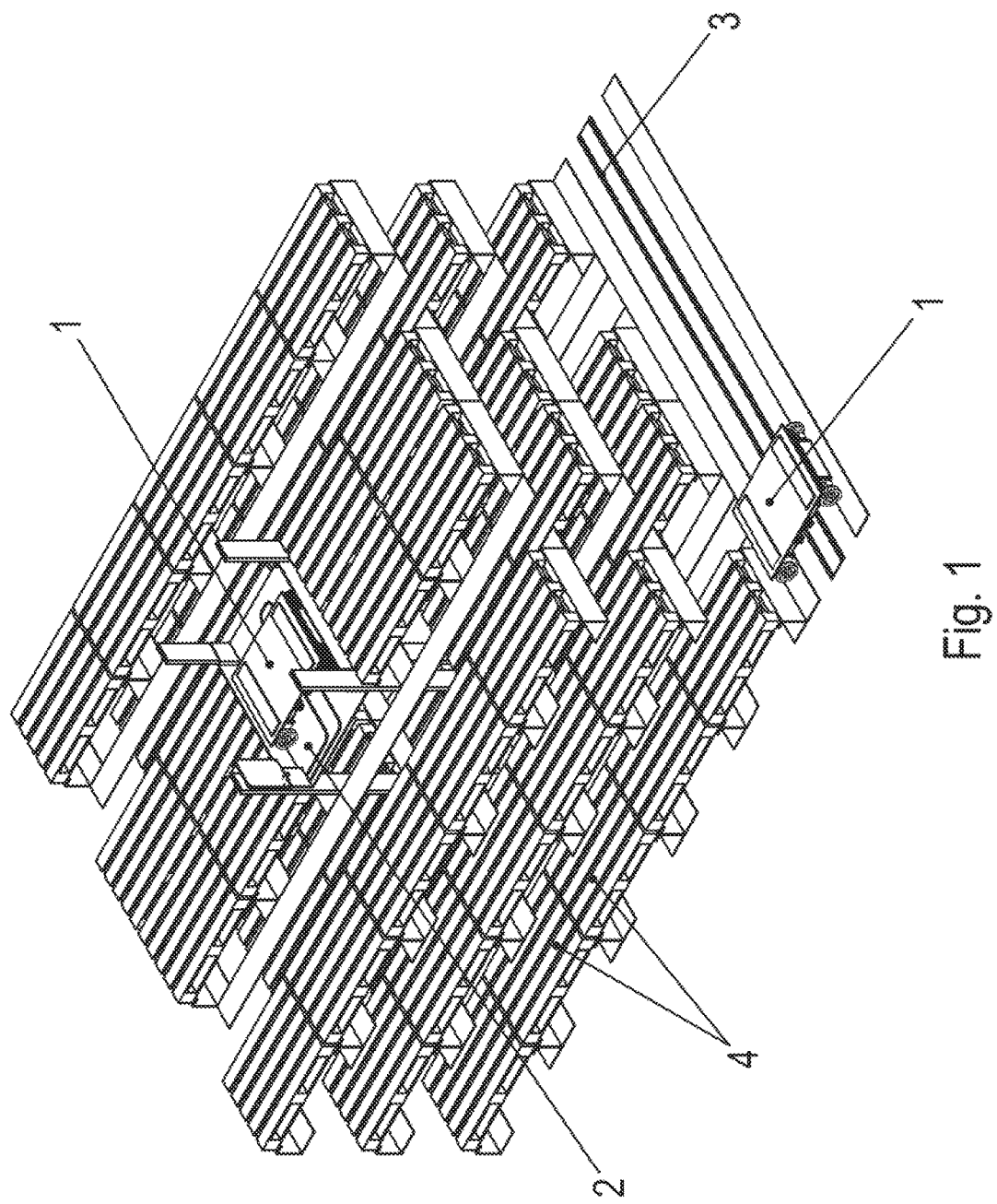
FIG. 1 is a perspective view of a racking, where vehicles 1 are able to pick up loads 4, in particular by underriding and lifting a top plate of the vehicle. The racking has a plurality of levels and a lift for vehicles 1.
Figure 2:
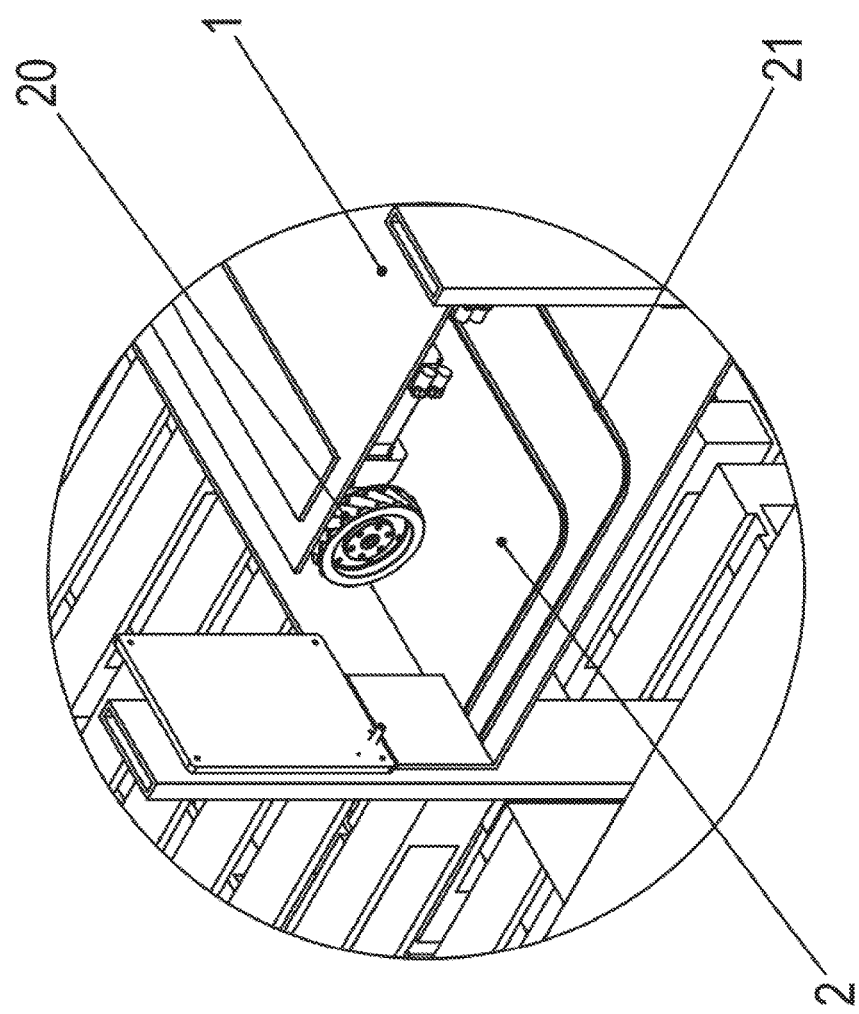
FIG. 2 is an enlarged, perspective, partial cross-sectional view of a vehicle 1 that is situated on a hoisting platform 2.
Figure 3:
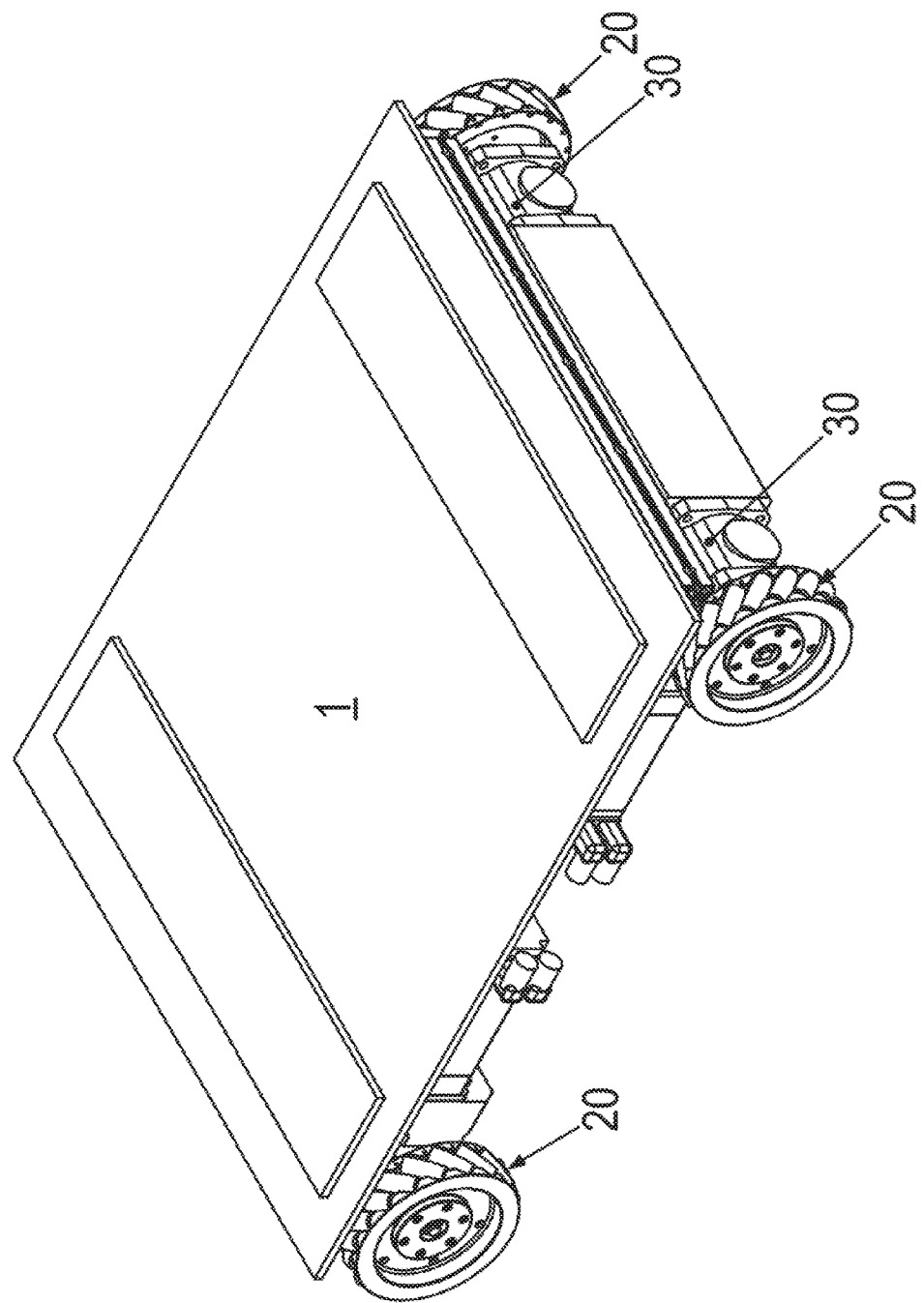
In FIG. 3, vehicle 1 is shown with four omnidirectional wheels 20 in a perspective view.
Figure 4:
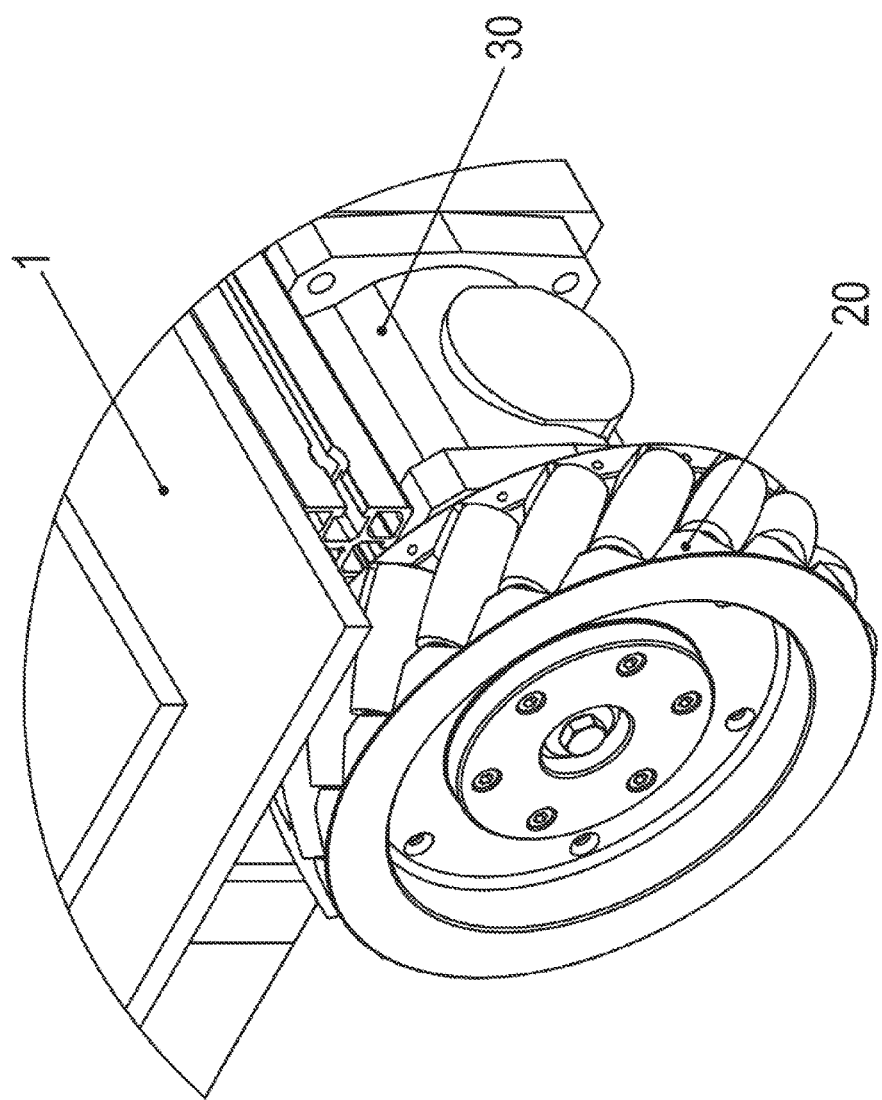
FIG. 4 is an enlarged, perspective, partial cross-sectional view.

As shown in the Figures, the racking has a plurality of levels, which are able to be reached with the aid of a lift.

To begin with, vehicles 1 drive straight ahead in the main aisle and then turn into a side aisle that is aligned at a right angle to the main aisle. As illustrated in FIG. 5, due to the four omnidirectional wheels that are individually driven by a drive 30, vehicles 1 are movable without a rotation during cornering.

After passing through the side aisle, vehicle 1 underrides a load 4 and picks it up in that a top plate of vehicle 1 is raised. The raising takes place with the aid of a hoisting gear that is disposed on vehicle 1 and thus is moved along by the vehicle.

A secondary winding, which is able to be inductively coupled with a primary conductor installed in and along the main aisle, or which is able to be inductively coupled with a primary conductor situated on hoisting platform 2, is situated on the underside of vehicle 1. When a medium-frequency current having a frequency of between 10 kHz and 1 MHz is applied to the primary conductor, energy is therefore able to be transferred to the vehicle.

The secondary winding is connected on the vehicle to a capacitance, in series or in parallel, such that the resonant frequency of the oscillating circuit created in this way essentially corresponds to the frequency of the medium-frequency current impressed into the primary conductor. In this manner, no precise positioning of the vehicle relative to the primary conductor is necessary yet high efficiency is nevertheless achievable in the inductive transfer of electric power.

The vehicle is equipped with an energy store, which is able to be charged in this manner. The travel through the side aisle or the underriding of load 4 is carried out by supplying drives 30 from the energy store.

Loads 4 are jacked up in the racking in each case so vehicle 1 is able to underride a respective load 4 when the hoisting gear is retracted.

To permit travel of the trajectory, and travel through the main aisle and the side aisle without rotating vehicle 1, each wheel of the four omnidirectional wheels 20 is individually drivable by a respective drive 30.

Drive 30 may be arranged as an electric motor in each case, such as a synchronous motor or an asynchronous motor. Alternatively, geared motors are also able to be employed.

Instead of the rounded turning operation that is shown in FIG. 5, a rectangular turning operation is possible as well. For this purpose, the vehicle is braked and stopped during forward driving, for instance in the main aisle. Then, the sideways driving, i.e., the entering of the side lane, is initiated by accelerating vehicle 1. However, the braking and accelerating operations that are necessary in this case require more time than the previously mentioned negotiating of a rounded trajectory 50.

LIST OF REFERENCE NUMERALS 1 vehicle
2 hoisting platform
3 primary conductor
4 load
20 omnidirectional wheel
21 primary conductor
30 drive element, in particular electric motor
50 trajectory from main lane to side lane

The invention claimed is:

1. A system, comprising:
a multi-level racking system including aisles and a hoisting platform movable vertically between the levels of the multi-level racking system;
a vehicle having omnidirectional wheels;
wherein a secondary winding, which is inductively couplable with a primary conductor disposed in the hoisting platform and which is inductively couplable with a primary conductor disposed in the aisle, is situated on an underside of the vehicle; and wherein a capacitance is connected to the secondary winding, in series or in parallel, to form a resonant frequency of an oscillating circuit that substantially corresponds to a frequency of a current impressed into the primary conductor.

2. The system according to claim 1, wherein each omnidirectional wheel includes a drive.

3. The system according to claim 1, wherein the vehicle has a length and a width, and an absolute amount of the length is greater than an absolute amount of the width.

4. The system according to claim 3, wherein a main aisle is at least as wide as the length.

5. The system according to claim 3, wherein a side aisle is at least as wide as the width and narrower than the length.

6. The system according to claim 1, wherein the vehicle includes a hoisting gear such that a load is able to be carried by underriding the load with the vehicle and subsequent lifting of the hoisting gear.

7. A method for operating a system according to claim 1, comprising:
bringing the vehicle from forward travel to sideways travel via a curve, wherein the vehicle is not rotated relative to stationary parts of the system.

8. A method for operating a system according to claim 1, comprising:
bringing the vehicle from forward travel to sideways travel by braking, stopping, and subsequently accelerating in a transverse direction, wherein the vehicle is not rotated relative to stationary parts of the system.

* * * * *